United States Patent
Kim

(10) Patent No.: US 12,217,491 B2
(45) Date of Patent: Feb. 4, 2025

(54) METHOD FOR INSPECTING LABELING ON BOUNDING BOX BY USING DEEP LEARNING MODEL AND APPARATUS USING SAME

(71) Applicant: SELECT STAR, INC., Daejeon (KR)

(72) Inventor: Se Yeob Kim, Seoul (KR)

(73) Assignee: SELECT STAR, INC., Daejeon (KR)

( * ) Notice: Subject to any disclaimer, the term of this patent is extended or adjusted under 35 U.S.C. 154(b) by 246 days.

(21) Appl. No.: 17/771,476

(22) PCT Filed: Dec. 1, 2020

(86) PCT No.: PCT/KR2020/017350
§ 371 (c)(1),
(2) Date: Apr. 24, 2022

(87) PCT Pub. No.: WO2021/125619
PCT Pub. Date: Jun. 24, 2021

(65) Prior Publication Data
US 2022/0366677 A1  Nov. 17, 2022

(30) Foreign Application Priority Data
Dec. 20, 2019  (KR) .................. 10-2019-0172044

(51) Int. Cl.
*G06V 10/776* (2022.01)
*G06V 10/25* (2022.01)
(Continued)

(52) U.S. Cl.
CPC ............ *G06V 10/776* (2022.01); *G06V 10/25* (2022.01); *G06V 10/774* (2022.01); *G06V 20/70* (2022.01)

(58) Field of Classification Search
CPC .. G06V 10/25; G06V 10/774; G06V 10/7747; G06V 10/7753; G06V 10/776; G06V 20/70
See application file for complete search history.

(56) References Cited

U.S. PATENT DOCUMENTS 10,748,035 B2 *  8/2020  Lee ..................... G06V 10/82
10,885,388 B1 *  1/2021  Kim ..................... G06F 18/217
(Continued)

FOREIGN PATENT DOCUMENTS

JP  2016-181036  10/2016
KR  10-1879735  7/2018
(Continued)

OTHER PUBLICATIONS

Schubert et al, "Identifying Label Errors in Object Detection Datasets by Loss Inspection", Proceedings of the IEEE/CVF Winter Conference on Applications of Computer Vision (WACV), pp. 4582-4591 (Year: 2024).*

(Continued)

*Primary Examiner* — Scott A Rogers

(57) ABSTRACT

According to the present invention, proposed is a method for inspecting a labeling operation, the method comprising, when a deep learning model for inspecting a labeling operation for a bounding box corresponding to an object included in an image is present and a computing apparatus uses the deep learning model, the steps of: performing, by the computing apparatus, first training on the deep learning model on the basis of a training image; obtaining, by the computing apparatus, an operation image and a bounding box labeling value therefor; calculating, by the computing apparatus, a score for inspection by performing a calculation while passing the operation image and the bounding box labeling value through the deep learning model; and determining, by the computing apparatus, whether the bounding (Continued)

box labeling value for the operation image is accurate on the basis of the score for inspection and performing any one of a pass process, a fail process, and a re-inspection process.

7 Claims, 5 Drawing Sheets

(51) Int. Cl.
  *G06V 10/774* (2022.01)
  *G06V 20/70* (2022.01)

(56) References Cited

U.S. PATENT DOCUMENTS

| | | | |
|---|---|---|---|
| 11,446,008 B2* | 9/2022 | Mehanian | G06F 17/18 |
| 11,830,237 B2* | 11/2023 | Kim | G06V 10/761 |
| 2022/0366250 A1* | 11/2022 | Kim | G06Q 10/063112 |
| 2022/0391616 A1* | 12/2022 | Tsui | G06V 20/58 |
| 2023/0334291 A1* | 10/2023 | Parameswaran | G06N 3/045 |

FOREIGN PATENT DOCUMENTS

| | | | |
|---|---|---|---|
| KR | 10-1887415 | | 8/2018 |
| KR | 10-1968449 | | 4/2019 |
| KR | 10-2019-0117837 | | 10/2019 |
| KR | 102143780 B1 | * | 8/2020 |
| KR | 102337692 B1 | * | 12/2021 |
| WO | WO-2021118041 A1 | * | 6/2021 ............. G06K 9/627 |

OTHER PUBLICATIONS

Piculjan et al, "Machine learning-based label quality assurance for object detection projects in requirements engineering." Applied Sciences 13.10: 6234. (Year: 2023).*
Office Action for Korea Patent Application No. 10-2019-0172044, dated Mar. 3, 2020.
PCT International Search Report for International Application No. PCT/KR2020/017350, Date of Mailing: Feb. 24, 2021.

* cited by examiner

FIG. 4

SECOND THRESHOLD < $Q^{TH}$ THRESHOLD < $P^{TH}$ THRESHOLD < FIRST THRESHOLD

METHOD FOR INSPECTING LABELING ON BOUNDING BOX BY USING DEEP LEARNING MODEL AND APPARATUS USING SAME

TECHNICAL FIELD

The present invention relates to a method for inspecting labeling on a bounding box by using a deep learning model, in which the deep learning model for inspecting a labeling operation for the bounding box corresponding to an object included in an image is present, and a computing apparatus uses the deep learning model, the method including: performing, by the computing apparatus, first training on the deep learning model based on a training image; obtaining, by the computing apparatus, an operation image and a bounding box labeling value for the operation image; calculating, by the computing apparatus, an inspection score by performing calculation while passing the operation image and the bounding box labeling value through the deep learning model; and determining, by the computing apparatus, whether the bounding box labeling value for the operation image is accurate based on the inspection score, and performing any one of pass processing, fail processing, and re-inspection processing.

BACKGROUND ART

As the artificial intelligence develops, a recognition technology for more accurately recognizing an object included in a video, an image, a text sentence, a voice, or the like has been developed. In this case, the recognition technology may collect various data from a deep learning model and require an iterative training process based on the collected data. Regarding the training process, correct answer data that is a comparison target may be required, and the correct answer data may be usually collected from labeling operations of an operator.

In this case, since the deep learning model is trained from the data, accuracy of labeling is very important. Therefore, inspection for the labeling may be essential, and in general, the inspection has been performed directly and manually by the operator. However, in this case, much time and effort may be required, which is inefficient.

Accordingly, the present inventor intends to propose a method for inspecting labeling on a bounding box by using a deep learning model and an apparatus using the same.

DISCLOSURE

Technical Problem

An object of the present invention is to solve all the problems described above.

Another object of the present invention is to increase efficiency by automatically or semi-automatically inspecting data on which a labeling operation is completed.

In addition, still another object of the present invention is to improve accuracy of a deep learning model by classifying data according to an inspection result, and retraining the deep learning model by using the classified data.

Technical Solution

A characteristic configuration of the present invention for achieving the objects of the present invention described above and implementing characteristic effects of the present invention that will be described below is as follows.

According to one aspect of the present invention, there is provided a method for inspecting a labeling operation, in which a deep learning model for inspecting the labeling operation for a bounding box corresponding to an object included in an image is present, and a computing apparatus uses the deep learning model, the method including: performing, by the computing apparatus, first training on the deep learning model based on a training image; obtaining, by the computing apparatus, an operation image and a bounding box labeling value for the operation image; calculating, by the computing apparatus, an inspection score by performing calculation while passing the operation image and the bounding box labeling value through the deep learning model; and determining, by the computing apparatus, whether the bounding box labeling value for the operation image is accurate based on the inspection score, and performing any one of pass processing, fail processing, and re-inspection processing.

In addition, according to another aspect of the present invention, there is provided a computing apparatus, which is an apparatus for inspecting a labeling operation, in which a deep learning model for inspecting the labeling operation for a bounding box corresponding to an object included in an image is present, and the computing apparatus uses the deep learning model, the computing apparatus including: a communication unit for transmitting and receiving information to and from an operator terminal; and a processor for performing first training on the deep learning model based on a training image, obtaining an operation image and a bounding box labeling value for the operation image, calculating an inspection score by performing calculation while passing the operation image and the bounding box labeling value through the deep learning model, determining whether the bounding box labeling value for the operation image is accurate based on the inspection score, and performing any one of pass processing, fail processing, and re-inspection processing.

Advantageous Effects

According to the present invention, the following effects can be obtained.

According to the present invention, efficiency can be increased by automatically or semi-automatically inspecting data on which a labeling operation is completed.

In addition, according to the present invention, accuracy of a deep learning model can be improved by classifying data according to an inspection result, and retraining the deep learning model by using the classified data.

DESCRIPTION OF DRAWINGS

FIG. 4 is a view showing a size of a threshold associated with an inspection score according to one embodiment of the present invention.

MODE FOR INVENTION

Figure 1:
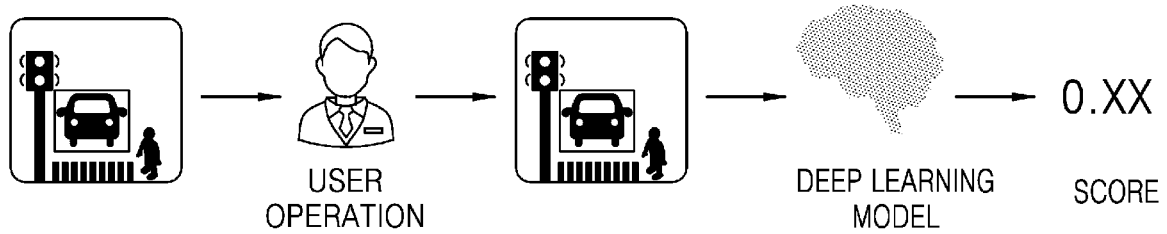
FIG. 1 is a view showing a concept of a process of inspecting labeled data according to one embodiment of the present invention.

The following detailed descriptions of the present invention are given for specific embodiments in which the present invention may be practiced with reference to the accompanying drawings that illustrate the specific embodiments. These embodiments are described in sufficient detail to enable those skilled in the art to practice the present invention. It should be understood that various embodiments of the present invention are different from each other, but need not be mutually exclusive. For example, specific shapes, structures, and characteristics described herein may be implemented and changed from one embodiment to another embodiment without departing from the idea and scope of the present invention. In addition, it should be understood that locations or arrangements of individual elements within each embodiment described herein may be changed without departing from the idea and scope of the present invention. Therefore, the following detailed description is not intended to be taken in a limiting sense, and the scope of the invention is defined only by the appended claims while encompassing the scope of all equivalents of the claimed invention when appropriately described. In the drawings, like reference numerals refer to elements that perform like or similar functions in various aspects.

Hereinafter, in order to enable a person having ordinary skill in the art to which the present invention pertains to easily practice the present invention, preferred embodiments of the present invention will be described in detail with reference to the accompanying drawings.

FIG. 1 is a view showing a concept of a process of inspecting labeled data according to one embodiment of the present invention.

The present invention provides an apparatus (including a deep learning model) for inspecting a labeling operation after the labeling operation is performed on a bounding box corresponding to an object included in an image.

As shown in FIG. 1, operators may perform the labeling operation on the object included in the image by using the bounding box, and obtain an inspection score while passing a result of performing the labeling operation through the deep learning model.

For reference, the labeling operation using the bounding box may include a process of calculating at least one of a coordinate value of the bounding box for the object included in the image, a type (classification) of the object, and error degrees of a coordinate and type classification of the bounding box.

For example, when the object in the image is present, the coordinate value (x, y, z) of the bounding box for the object may be calculated, probability of the object being a vehicle may be calculated, or error degrees of a coordinate and vehicle classification may be calculated. The above operations may correspond to the labeling operation using the bounding box.

Figure 2:
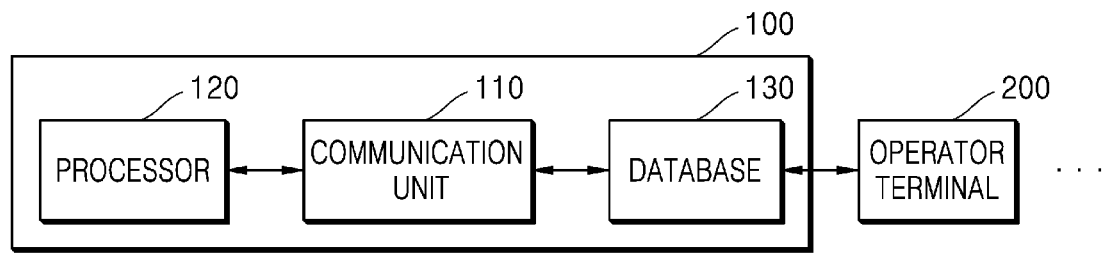
FIG. 2 is a view showing a schematic configuration of a computing apparatus according to one embodiment of the present invention.

FIG. 2 is a view showing a schematic configuration of a computing apparatus according to one embodiment of the present invention.

According to the present invention, a computing apparatus 100 for controlling a deep learning model and the like may include a communication unit 110 and a processor 120. In some cases, unlike FIG. 2, the computing apparatus 100 may not include a database 130.

First, the communication unit 110 of the computing apparatus 100 may be implemented with various communication technologies. In other words, Wi-Fi, wideband CDMA (WCDMA), high speed downlink packet access (HSDPA), high speed uplink packet access (HSUPA), high speed packet access (HSPA), mobile WiMAX, WiBro, long term evolution (LTE), 5G, Bluetooth, infrared data association (IrDA), near field communication (NFC), Zigbee, a wireless LAN technology, and the like may be applied to the communication unit 110. In addition, when the communication unit 110 is connected to the Internet to provide a service, the communication unit 110 may conform to TCP/IP, which is a standard protocol for information transmission on the Internet.

Next, according to the present invention, the database 130 may store obtained data (e.g., data labeled by an operator, etc.). For reference, when an external database is used, the computing apparatus 100 may access the external database through the communication unit 110.

In addition, the computing apparatus 100 may communicate with an operator terminal 200 through the communication unit 110. In this case, any digital device configured to perform communication, having a memory device, and equipped with a microprocessor to have calculation ability, such as a desktop computer, a laptop computer, a workstation, a PDA, a web pad, a mobile phone, a smart remote control, or various IoT main devices, may correspond to the operator terminal 200 according to the present invention.

Meanwhile, the processor 120 may perform calculation and the like in the deep learning model, which will be described in detail below.

For reference, the deep learning model according to the present invention may include a convolution layer and a fully connected (FC) layer. In this case, the FC layer may perform calculation by using a result value calculated in the convolution layer.

Figure 3:
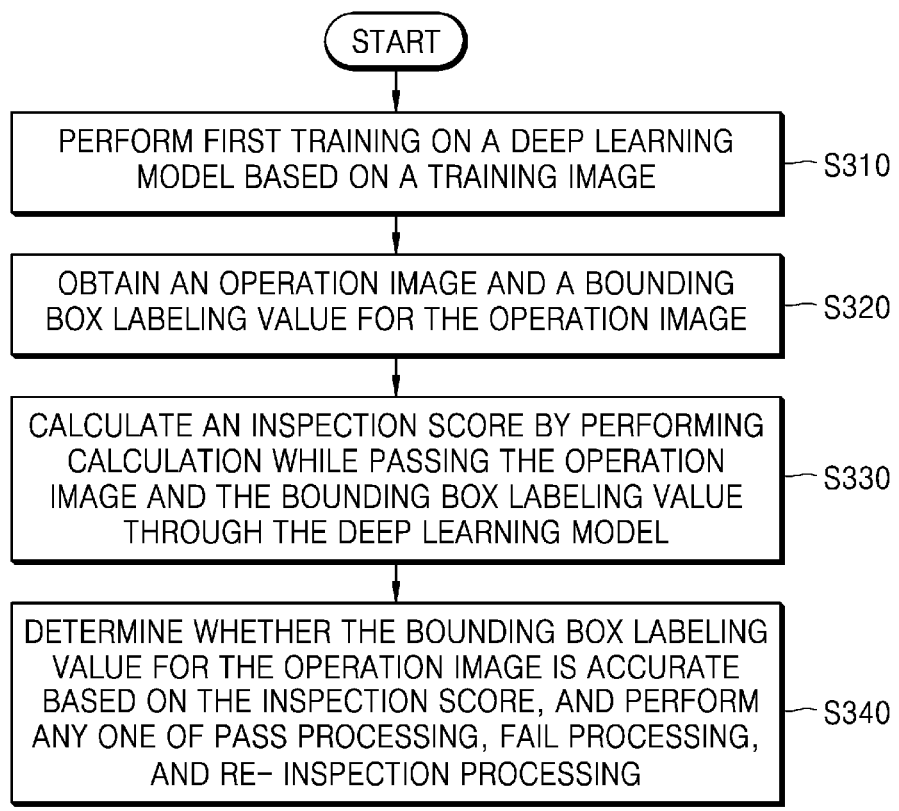
FIG. 3 is a view showing the process of inspecting the labeled data according to one embodiment of the present invention.

FIG. 3 is a view showing the process of inspecting the labeled data according to one embodiment of the present invention.

First, in order for an inspection process to be performed in the deep learning model, first training has to be preceded on the deep learning model (S310). In other words, the deep learning model has to be trained in order to have inspection ability. In detail, adjustment of at least one parameter that is present in the deep learning model may be required.

First, the processor 120 of the computing apparatus 100 may perform calculation while passing a training image and a correct answer bounding box labeling value through the deep learning model, and adjust the at least one parameter so that a result of performing the calculation is 1.

The correct answer bounding box labeling value may correspond to a value that accurately represents the object included in the training image. For reference, the correct answer bounding box labeling value may be obtained from a reliable operator or the like.

In addition, since it is assumed that the correct answer bounding box labeling value has accuracy of 100%, the processor 120 may adjust the parameter so that the result of performing the calculation in the deep learning model has a probability value of 1.

In addition, the processor 120 of the computing apparatus 100 may perform calculation while passing the training image and an incorrect answer bounding box labeling value through the deep learning model, and adjust the at least one parameter so that a result of performing the calculation is 0.

Since the incorrect answer bounding box labeling value does not represent the object included in the training image, the processor 120 may adjust the parameter so that the result of performing the calculation in the deep learning model has a probability value of 0.

While the above training process (first training) is performed, the processor 120 may obtain an operation image and a bounding box labeling value for the operation image (S320).

In this case, the bounding box labeling value may be a result obtained by performing a labeling operation on an object included in the operation image, which may be mainly performed by the operator the like. As a result, the deep learning model according to the present invention may perform a process of inspecting the result of the labeling operation performed by the operator or the like.

As described above, the processor 120 may obtain the operation image and the bounding box labeling value for the operation image, and may calculate an inspection score as an output value by performing calculation while passing the operation image and the bounding box labeling value as input values through the deep learning model on which the first training is performed (S330).

In this case, the inspection score may correspond to a probability value a, and the probability value a may be greater than or equal to 0 and less than or equal to 1 (i.e., $0<=a<=1$).

For reference, it may be determined that labeling becomes more accurate as the inspection score (probability value) becomes closer to 1, and the labeling becomes more inaccurate as the inspection score becomes closer to 0.

The processor 120 may determine whether the bounding box labeling value for the operation image is accurate based on the inspection score, and perform any one of pass processing, fail processing, and re-inspection processing (S340).

A process of performing any one of the pass processing, the fail processing, and the re-inspection processing will be described with reference to FIGS. 4 and 5 below.

FIG. 4 is a view showing a size of a threshold associated with an inspection score according to one embodiment of the present invention.

Figure 5:
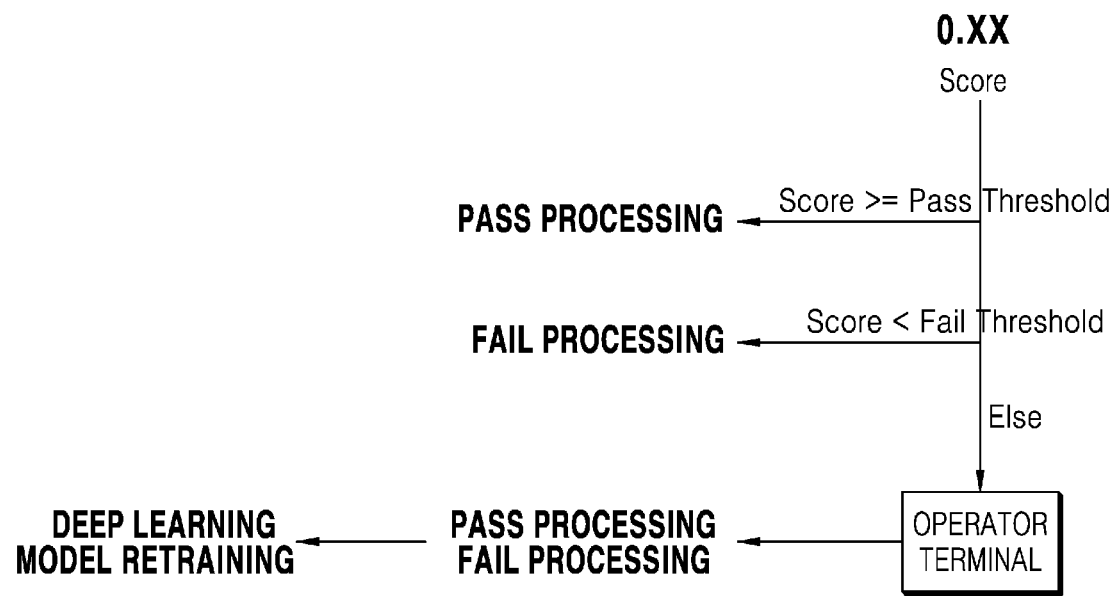
FIG. 5 is a view showing a processing process based on a calculated inspection score according to one embodiment of the present invention.

FIG. 5 is a view showing a processing process based on a calculated inspection score according to one embodiment of the present invention.

First, according to the present invention, in order to determine whether the bounding box labeling value is accurate, a first threshold and a second threshold may be considered in association with the inspection score. In this case, it may be assumed that the first threshold is greater than the second threshold.

The processor 120 may perform the pass processing on the bounding box labeling value for the operation image when the calculated inspection score is greater than or equal to the first threshold (pass threshold of FIG. 5).

In addition, the processor 120 may perform the fail processing on the bounding box labeling value for the operation image when the calculated inspection score is less than the second threshold (fail threshold of FIG. 5).

In other words, the processor 120 may consider the labeling operation as being accurate so as to automatically perform the pass processing when the inspection score calculated in the deep learning model is greater than or equal to the pass threshold.

On the contrary, the processor 120 may consider the labeling operation as being inaccurate so as to automatically perform the fail processing when the inspection score is less than the fail threshold.

For example, while the pass threshold is 0.8, and the fail threshold is 0.2, the pass processing may be performed when the inspection score is 0.9, and the fail processing may be performed when the inspection score is 0.05.

However, the processor 120 may perform the re-inspection processing on the bounding box labeling value for the operation image when the inspection score is less than the first threshold and greater than or equal to the second threshold.

In detail, the processor 120 may transmit the operation image and bounding box labeling value, which are subject to the re-inspection processing, to the operator terminal 200 so as to support re-inspection to be performed in the operator terminal 200.

In this case, a re-inspection process processed in the operator terminal 200 may be considered as being accurate, and the re-inspection process may be processed by a separate program in the operator terminal 200 or a reliable operator.

In addition, the processor 120 may perform second training (retraining) on the deep learning model based on a result of the re-inspection.

In detail, when the re-inspection result processed in the operator terminal 200 is pass, the processor 120 may adjust the parameter of the deep learning model so that an output is 1 when the operation image and the bounding box labeling value are used as inputs.

In addition, when the re-inspection result is fail, the processor 120 may adjust the parameter of the deep learning model so that the output is 0 when the operation image and the bounding box labeling value are used as inputs.

As another embodiment, the processor 120 may adjust the first threshold and the second threshold based on the re-inspection result.

For example, a situation in which while the pass threshold is 0.9, the re-inspection processing was performed because the inspection score is 0.8, and the pass processing was performed as a result of the re-inspection in the operator terminal 200 may be assumed.

In this case, although the pass threshold is initially 0.9, the processor 120 may determine to perform the pass processing even in a case of 0.8, and adjust the pass threshold to 0.8.

In addition, a situation in which while the fail threshold is 0.2, the re-inspection processing was performed because the inspection score is 0.3, and the fail processing was performed as a result of the re-inspection in the operator terminal 200 may be assumed.

In this case, although the fail threshold is initially 0.2, the processor 120 may determine to perform the fail processing even in a case of 0.3, and adjust the fail threshold to 0.3.

As still another embodiment, the processor 120 may adjust the pass threshold to 0.8 when a result of performing calculation on a predetermined number (e.g., 5) or more of operation images and bounding box labeling values in the deep learning model is 0.8, and the pass processing is performed as a result of re-inspection.

As an example to assist the description, it may be assumed that five operation images and bounding box labeling values of the operation images were passed through the deep learning model, and all five calculation results were 0.8, respectively. In addition, it may be assumed that the re-inspection processing was performed due to the initial pass threshold (0.9), and all five re-inspection results were subject to the pass processing.

As described above, when the pass processing is performed as a result of performing the re-inspection process on a predetermined number (e.g., 5) or more of data, the pass threshold may be adjusted. Similarly, when the fail processing is performed as a result of performing the re-inspection process on a predetermined number (e.g., 5) or more of data, the fail threshold may be adjusted.

However, when the pass/fail processing is performed as a result of performing the re-inspection process on three data, the pass/fail threshold may not be adjusted.

Meanwhile, it may be assumed that a plurality of operators are present, and grades of the operators are classified based on an operation performance value. In this case, the operation performance value may be set based on a number of times of performing a labeling operation stored in the database, experience, and the like.

In addition, as shown in FIG. 4, it may be assumed that at least a $p^{th}$ threshold and a $q^{th}$ threshold that are less than the first threshold and greater than the second threshold are present, and the $p^{th}$ threshold is greater than the $q^{th}$ threshold.

In this case, the processor 120 may support re-inspection to be performed in a terminal 200 of an operator having a low grade when the inspection score is less than the first threshold and greater than or equal to the $p^{th}$ threshold, or when the inspection score is less than the $q^{th}$ threshold and greater than or equal to the second threshold.

In addition, the processor 120 may support the re-inspection to be performed in a terminal 200 of an operator having a high grade when the inspection score is less than the $p^{th}$ threshold and greater than or equal to the $q^{th}$ threshold.

This is because as the inspection score becomes closer to the pass threshold (first threshold), probability of the pass processing may be increased, and confirmation thereof may be facilitated, so that even the operator having the low grade may perform the confirmation.

In addition, as the inspection score becomes closer to the fail threshold (second threshold), probability of the fail processing may be increased, confirmation thereof may be facilitated, so that even the operator having the low grade may perform the confirmation.

Meanwhile, when the inspection score is different from the first threshold and the second threshold (i.e., between the $q^{th}$ threshold and the $p^{th}$ threshold), it may be difficult to determine whether to perform the pass processing or the fail processing. Therefore, in the above case, the processor 120 may support the re-inspection to be performed in the terminal 200 of the operator having the high grade.

The embodiments according to the present invention described above may be implemented in the form of a program instruction that may be executed through various computer components, and may be recorded in a computer-readable recording medium. The computer-readable recording medium may include a program instruction, a data file, a data structure, and the like, alone or in combination with each other. The program instruction recorded on the computer-readable recording medium may be specially designed and configured for the present invention, or may be known and available to those skilled in the art of computer software. An example of the computer-readable recording medium includes magnetic media such as a hard disk, a floppy disk, and a magnetic tape, optical recording media such as a CD-ROM and a DVD, magneto-optical media such as a floptical disk, and a hardware device specially configured to store and execute a program instruction, such as a ROM, a RAM, and a flash memory. An example of the program instruction includes a high-level language code that may be executed by a computer by using an interpreter or the like, as well as a machine language code such as those generated by a compiler. The hardware device may be configured to operate as at least one software module to perform the processing according to the present invention, and vice versa.

Although the present invention has been described above by specified embodiments and drawings as well as certain matters such as specific elements, the embodiments and drawings are provided only to assist an overall understanding of the present invention, so the present invention is not limited to the embodiments, and various changes and modifications can be made from the above description by a person having ordinary skill in the art to which the present invention pertains.

Therefore, the idea of the present invention should not be construed as being limited to the embodiments described above, and the scope of the idea of the present invention encompasses the scope of the appended claims and all variations equivalent thereto or modified equivalently thereto.

The invention claimed is:

1. A method for inspecting a labeling operation, in which a deep learning model for inspecting the labeling operation for a bounding box corresponding to an object included in an image is present, and a computing apparatus uses the deep learning model, the method comprising:
  (a) performing, by the computing apparatus, first training on the deep learning model based on a training image;
  (b) obtaining, by the computing apparatus, an operation image and a bounding box labeling value for the operation image;
  (c) calculating, by the computing apparatus, an inspection score by performing calculation while passing the operation image and the bounding box labeling value through the deep learning model; and
  (d) determining, by the computing apparatus, whether the bounding box labeling value for the operation image is accurate based on the inspection score, and performing any one of pass processing, fail processing, and re-inspection processing,
  wherein, upon a first pair of threshold values provided where a first threshold value of the pair is greater than a second threshold value of the pair, the computing apparatus is configured to:
  perform the pass processing on the operation image and the bounding box labeling value when the inspection score is greater than or equal to the first threshold value;
  perform the re-inspection processing on the operation image and the bounding box labeling value when the inspection score is less than the first threshold and greater than or equal to the second threshold value; and
  perform the fail processing on the operation image and the bounding box labeling value when the inspection score is less than the second threshold value; and
  wherein, the computing apparatus determines who is qualified to perform the re-inspection processing according to various levels of the labeling operation difficulty by (1) arranging a second pair of threshold values within the first and second threshold values and (2) finding a location of the inspection score within a particular range of the threshold values of the first and second pairs, in which third and fourth threshold values of the second pair are less than the first threshold value and greater than the second threshold value, respectively, and the third threshold value is greater than the fourth threshold value.

2. The method of claim 1, wherein the computing apparatus is configured to transmit the operation image and the bounding box labeling value, which are subject to the re-inspection processing, to an operator terminal so as to support re-inspection to be performed in the operator terminal, and perform second training on the deep learning model based on a result of the re-inspection.

3. The method of claim 2, wherein the computing apparatus is configured to adjust the first threshold value and the second threshold value based on the result of the re-inspection.

4. The method of claim 1, wherein, a plurality of operators are classified based on corresponding operation performance values, when at least a $p^{th}$ threshold value and a $q^{th}$ threshold value that are less than the first threshold value and greater than the second threshold value are present, and the $p^{th}$ threshold value is greater than the $q^{th}$ threshold value, the computing apparatus is configured to:
i) support re-inspection to be performed in a terminal of an operator having a low grade when the inspection score is less than the first threshold value and greater than or equal to the $p^{th}$ threshold value, or when the inspection score is less than the $q^{th}$ threshold value and greater than or equal to the second threshold value; and
ii) support the re-inspection to be performed in a terminal of an operator having a high grade when the inspection score is less than the $p^{th}$ threshold value and greater than or equal to the $q^{th}$ threshold value.

5. The method of claim 1, wherein the inspection score is a probability value corresponding to a, and satisfies $0<=a<=1$.

6. The method of claim 1, wherein, in the step (a),
while at least one parameter is present to perform the calculation of the deep learning model,
the computing apparatus is configured to:
i) adjust the at least one parameter so that a result of performing the calculation while passing the training image and a correct answer bounding box labeling value through the deep learning model is 1; and
ii) adjust the at least one parameter so that a result of performing the calculation while passing the training image and an incorrect answer bounding box labeling value through the deep learning model is 0.

7. A computing apparatus, which is an apparatus for inspecting a labeling operation, in which a deep learning model for inspecting the labeling operation for a bounding box corresponding to an object included in an image is present, and the computing apparatus uses the deep learning model, the computing apparatus comprising:

a communication unit for transmitting and receiving information to and from an operation terminal; and a processor for performing first training on the deep learning model based on a training image, obtaining an operation image and a bounding box labeling value for the operation image, calculating an inspection score by performing calculation while passing the operation image and the bounding box labeling value through the deep learning model, determining whether the bounding box labeling value for the operation image is accurate based on the inspection score, and performing any one of pass processing, fail processing, and re-inspection processing, wherein, upon a first pair of threshold values provided where a first threshold value of the pair is greater than a second threshold value of the pair, the processor is configured to:

perform the pass processing on the operation image and the bounding box labeling value when the inspection score is greater than or equal to the first threshold value;

perform the re-inspection processing on the operation image and the bounding box labeling value when the inspection score is less than the first threshold and greater than or equal to the second threshold value; and perform the fail processing on the operation image and the bounding box labeling value when the inspection score is less than the second threshold value; and wherein, the computing apparatus determines who is qualified to perform the re-inspection processing according to various levels of the labeling operation difficulty by (1) arranging a second pair of threshold values within the first and second threshold values and (2) finding a location of the inspection score within a particular range of the threshold values of the first and second pairs, in which third and fourth threshold values of the second pair are less than the first threshold value and greater than the second threshold value, respectively, and the third threshold value is greater than the fourth threshold value.

* * * * *